March 10, 1970     L. W. WELLS     3,499,618
FILM CARTRIDGE HAVING A FLOATING FILM GUIDE
Filed Feb. 8, 1968
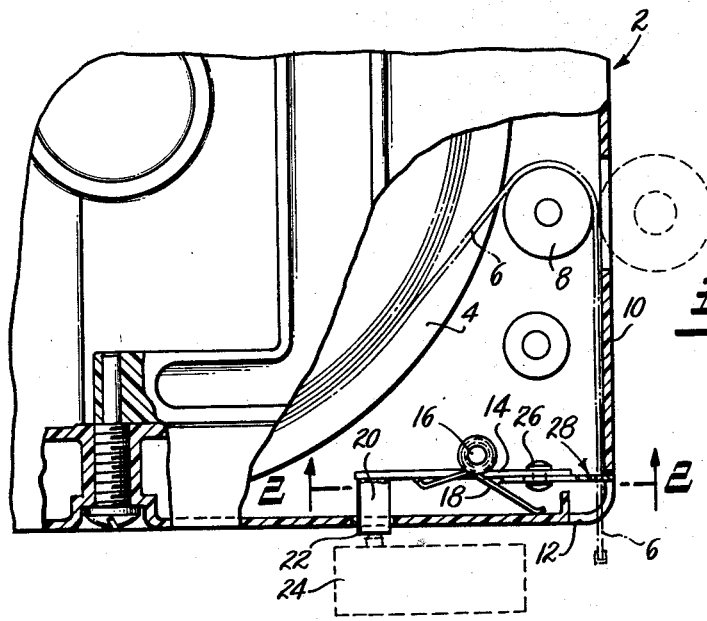
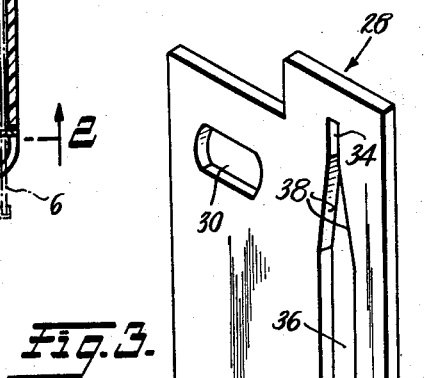
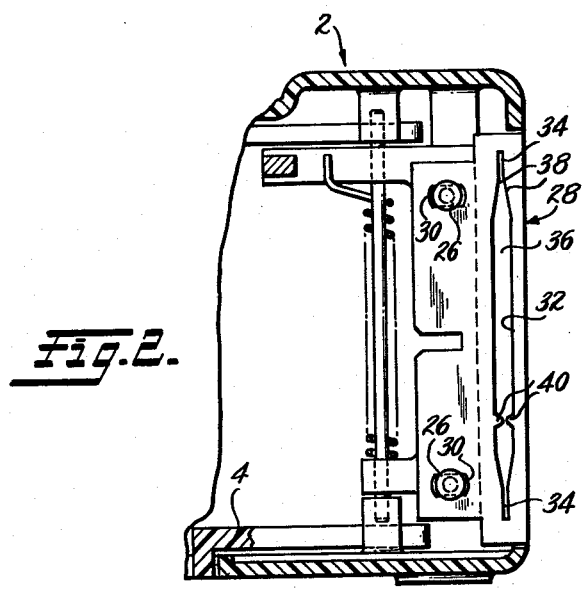
INVENTOR.
LEON W. WELLS
BY Lyon & Lyon
ATTORNEYS United States Patent Office 3,499,618
Patented Mar. 10, 1970

3,499,618
FILM CARTRIDGE HAVING A FLOATING FILM GUIDE
Leon W. Wells, Closter, N.J., assignor to Panopix Research Inc., New York, N.Y., a corporation of New York
Filed Feb. 8, 1968, Ser. No. 704,147
Int. Cl. G11b 23/04
U.S. Cl. 242—197     4 Claims

ABSTRACT OF THE DISCLOSURE

A film cartridge having a reel of film therein, the free end of which is provided with an enlargement and the film is guided to and from the cartridge through a slot in one end of a spring biased lever. When film is reeled into the cartridge the enlargement engages and swings the lever to actuate a switch to control terminal functions of a projector. The slotted end of the lever is floatingly mounted on the main portion so that it can accommodate to changing paths of movement of the film to and from the cartridge.

CROSS-REFERENCE TO RELATED APPLICATIONS

The present invention relates to an improvement in a film cartridge of the type disclosed in my prior application Ser. No. 621,259, filed Mar. 7, 1967.

BACKGROUND OF THE INVENTION

This invention relates to guide means for guiding motion picture film to and from a supply cartridge.

In my prior application Ser. No. 621,259, I disclosed a film cartridge containing a reel of wide film on which a multiplicity of rows of picture frames and sound tracks are provided. In projecting the pictures and sound, successive rows of picture frames are projected with the film travelling in respectively opposite directions. The film is guided to and from the cartridge by a narrow slot in one end of a lever and when projection is completed and film withdrawn into the cartridge, an enlargement on the end of the film engages the pivoted lever to cause the same to actuate a switch to cycle the projection mechanism through terminal cycles, all as fully described in my prior application.

As shown in Ser. No. 621,259, the film guiding slot was provided in one end of the lever and in immovable relation thereto. In some instances, however, it was found that the film in travelling to and from the cartridge tended to travel along slightly different paths and due to its great width there was at times a tendency for the film to twist, thus applying undesirable pressure on the guiding edges of the slot tending to change the speed of travel of the film and tending to unduly wear portions of the same.

SUMMARY OF THE INVENTION

The present invention relates to an improvement eliminating the above described disadvantages of my prior film cartridge. According to this invention the portion or element of the pivoted lever containing the guiding slot is separate from the lever itself and is mounted thereon for universal floating movement in a single plane transverse to the direction of travel of the film. Thus, the portion containing the guiding slot is free to accommodate itself to changes in the film path and/or tilt without exerting undue frictional forces on the film itself. The floatingly-arranged guide element is, however, restrained against tilting movement relative to the lever in any other plane, so that it will be effective to transfer force applied thereto by the enlargement on the film to effect swinging movement of the lever and actuation of the aforementioned switch.

BRIEF DESCRIPTION OF THE DRAWINGS

FIG. 1 is a fragmentary top plan view of a film cartridge showing the floating film guide of the present invention;

FIG. 2 is a fragmentary vertical sectional view taken on the line 2—2 of FIG. 1; and FIG. 3 is an enlarged isometric view of the floating film guide.

DESCRIPTION OF A PREFERRED EMBODIMENT

In the drawings numeral 2 designates generally a cartridge of the type disclosed in my prior application Ser. No. 621,259, within which is provided a rotary film reel 4 adapted to have a supply of film 6 wound thereon. The film 6 is guided from the reel 4 over an inner guiding roller 8 and then directed along the inner face of a side wall 10 of the cartridge to and through an opening 12 in one corner of the cartridge housing. Within the cartridge 2 is a lever 14 pivoted on an upright pivot member 16 and a torsion spring 18 urges the lever 14 to swing clockwise, as viewed in FIG. 1. At the inner end of the lever 14 there is provided a protuberance 20 extending outwardly through an opening 22 in the cartridge and in position to actuate the switch 24 mounted on the projector mechanism. All of the structure thus far described is essentially shown and described in more detail in Ser. No. 621,259.

The right hand end of lever 14 as viewed in FIGS. 1 and 2 terminates short of the path of travel of the film 6 and the outer face of the lever 14 at that end is substantially flat and planar. A pair of headed pins or rivets 26 is secured to the lever 14 and serve to mount a floating film guide 28 thereon. The film guide 28 is provided with a pair of parallel slots 30 elongated in a direction transverse to the length of a guide slot 32 therein, which will be more fully described later. The width of the slots 30 is slightly greater than the diameter of the stem portions of the rivets 26 so that the floating guide 28 is free to move in any direction parallel to the outer surface of the end of lever 14 through limited amounts but is restrained against tilting movement relative to the lever 14 about an axis parallel to the pivot member 16.

The guide slot 32 is provided with narrow end portions 34 of a width to receive and accurately guide the edge portions of the film 6 only in the region of the usual perforations. An intermediate portion 36 of the slot 32 is of greater width whereby it will not engage the side faces of those portions of film containing either the picture frames or the sound tracks. In my prior application, the wide portion of the slot terminated in abrupt shoulders adjacent the narrow portions 34. However, it was possible for film to curl sufficiently at one edge to come out of the narrow end portion, in which case the edge would abut the abrupt shoulder and it would not thereafter re-enter the narrow portion without assistance. In the improved guide slot disclosed herein the intermediate wide portion of the slot 36 and the narrow portion 34 are joined by converging side edges 38 which completely eliminate the difficulties noted above.

The projections 40 extending inwardly intermediate the ends of the slot 32 engage the film 6 in a region between the rows of picture frames and the sound tracks, all as described with reference to corresponding projections shown in my prior application Ser. No. 621,259.

Obviously, the floating guide 28 will function to properly guide the film 6 to and from the cartridge 2 since the slots 30 are so dimensioned that the film 6 cannot engage and rub against the wall 10 of the cartridge or engage the left edge of the opening 12, as shown in FIG. 1, and will be guided to and from film guiding and transport mechanism on the projector without ever binding the film or excessively rubbing any portion of the same.

While a single specific embodiment of the invention has been shown and described herein, the same is merely illustrative of the principles involved and it is contemplated that other embodiments may fall within the scope of the invention.

I claim:

1. A film cartridge comprising: a housing having motion picture film reeling and guiding means therein; said guiding means including a support; a guide member having an elongated slot therethrough for engaging and guiding film therethrough to and from said cartridge; and means mounting said member on said support for limited movement in a direction transverse to the direction of movement of film through said slot.

2. A cartridge as defined in claim 1 wherein said support comprises a lever pivotally mounted in said cartridge about an axis generally parallel to said slot; said means mounting said guide member on said support confining said guide member to movement in a single plane relative to said support whereby pivotal movement of said lever can be enforced by force applied to said guide member.

3. A cartridge as defined in claim 2 wherein said means mounting said guide member on said support permits limited universal movement in said single plane.

4. A cartridge as defined in claim 1 wherein said elongated slot comprises short narrow end portions adapted to embrace and guide only opposed edges of the film, a wide intermediate portion, and angularly converging edge portions extending from the edges of said wide intermediate portion to the edges of said narrow end portions whereby to eliminate abrupt shoulders between said portions.

References Cited

UNITED STATES PATENTS

| 956,178 | 4/1910 | Ryder | 352—78 X |
| 959,601 | 5/1910 | Power. | |
| 2,213,776 | 9/1940 | Walter | 242—71.1 |
| 3,195,824 | 7/1965 | Laa et al. | 242—55.13 |

GEORGE F. MAUTZ, Primary Examiner